(12) United States Patent
Yang et al.

(10) Patent No.: US 11,563,651 B2
(45) Date of Patent: Jan. 24, 2023

(54) METHOD FOR NETWORK SLICING, DEVICE AND STORAGE MEDIUM THEREOF

(71) Applicant: Beijing University of Posts and Telecommunications, Beijing (CN)

(72) Inventors: Hui Yang, Beijing (CN); Zhengjie Sun, Beijing (CN); Qiuyan Yao, Beijing (CN); Bowen Bao, Beijing (CN); Chao Li, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 261 days.

(21) Appl. No.: 17/130,302

(22) Filed: Dec. 22, 2020

(65) Prior Publication Data

US 2022/0158913 A1 May 19, 2022

(30) Foreign Application Priority Data

Nov. 16, 2020 (CN) .......................... 202011280927.7

(51) Int. Cl.
*H04L 12/24* (2006.01)
*H04L 41/5041* (2022.01)
(Continued)

(52) U.S. Cl.
CPC ....... *H04L 41/5045* (2013.01); *G06N 3/0454* (2013.01); *G06N 3/08* (2013.01);
(Continued)

(58) Field of Classification Search
CPC .............. H04L 41/5045; H04L 41/082; H04L 41/0896; H04L 41/16; H04L 47/11;
(Continued)

(56) References Cited

U.S. PATENT DOCUMENTS

2012/0316904 A1* 12/2012 Eder ....................... G06Q 40/06
705/7.11
2017/0318468 A1* 11/2017 Aijaz ................. H04W 72/0433
(Continued)

FOREIGN PATENT DOCUMENTS

CN 109495907 A * 3/2019 ............ H04W 24/02
CN 110198237 A * 9/2019 ......... H04L 41/0803
(Continued)

OTHER PUBLICATIONS

First Office Action issued in counterpart Chinese Patent Application No. 202011280927.7, dated Jul. 29, 2021.
(Continued)

*Primary Examiner* — Shean Tokuta
*Assistant Examiner* — Juan C Turriate Gastulo
(74) *Attorney, Agent, or Firm* — Westbridge IP LLC

(57) ABSTRACT

Disclosed is a method for network slicing, which includes: determining a service keyword of a service intention after receiving the service intention from a user; converting the service intention into a network request according to the service keyword of the service intention on the basis of a pre-established mapping model, wherein, the network request comprises at least one network requirement index; determining a set of network slicing configuration parameters according to the network request and current network environment state on the basis of a network slicing model, wherein the network slicing model is a deep neural network model for determining network slicing configuration parameters according to a network request and a network environment state; and performing a network slicing according to the set of network slicing configuration parameters. The present disclosure also provides a device for network slicing and a computer readable storage medium.

16 Claims, 4 Drawing Sheets

(51) Int. Cl.
*G06N 3/04* (2006.01)
*G06N 3/08* (2006.01)
*H04L 41/082* (2022.01)
*H04L 41/0896* (2022.01)
*H04L 41/16* (2022.01)
*H04L 47/11* (2022.01)

(52) U.S. Cl.
CPC ........ *H04L 41/082* (2013.01); *H04L 41/0896* (2013.01); *H04L 41/16* (2013.01); *H04L 47/11* (2013.01)

(58) Field of Classification Search
CPC ....... H04L 41/12; H04L 41/142; H04L 43/16; H04L 41/0806; H04L 41/145; H04L 41/5054; H04L 41/0893; G06N 3/0454; G06N 3/08; G06N 3/006; G06N 3/086; G06N 7/005; G06F 40/279
See application file for complete search history.

(56) References Cited

U.S. PATENT DOCUMENTS

| | | | |
|---|---|---|---|
| 2018/0317133 A1* | 11/2018 | Sciancalepore | H04W 16/02 |
| 2019/0174322 A1* | 6/2019 | Deviprasad | H04L 47/70 |
| 2020/0034493 A1* | 1/2020 | Kempf | G06F 16/90335 |
| 2020/0044909 A1* | 2/2020 | Huang | H04L 12/4641 |
| 2020/0178093 A1 | 6/2020 | Peng et al. | |

FOREIGN PATENT DOCUMENTS

| | | | |
|---|---|---|---|
| CN | 110198237 A | | 9/2019 |
| CN | 111277442 A | * | 6/2020 |
| CN | 111277442 A | | 6/2020 |

OTHER PUBLICATIONS

Second Office Action issued in counterpart Chinese Patent Application No. 202011280927.7, dated Oct. 19, 2021.
Yang, Intelligent Optical Network with AI and Blockchain, 2019 18th International Conference on Optical Communications and Networks, dated Dec. 19, 2019.

* cited by examiner

METHOD FOR NETWORK SLICING, DEVICE AND STORAGE MEDIUM THEREOF

CROSS-REFERENCE TO RELATED APPLICATIONS

The present application claims priority of Chinese patent application CN202011280927.7 filed on Nov. 16, 2020, the entire contents of which are incorporated herein by reference.

TECHNICAL FIELD

One or more examples of the present disclosure relate to network control technology, and more particularly, to a method for network slicing, a device for network slicing, and a storage medium.

BACKGROUND

With rapid developments of communication networks, rapid growth of network users and devices, current networks are more complicated and flexible. Therefore, an end-to-end network slicing strategy is needed to handle different services.

However, as the network slicing technology brings flexibility to the network, the complexity of network management is also increased accordingly.

SUMMARY

Accordingly, one or more examples of the present disclosure provide a method for network slicing, which can analyze an intention represented by a service request and convert the intention into requirements on various network indexes automatically, and then can complete a network slicing according to the requirements on the various network indexes. Therefore, the method of network slicing has a high flexibility and timeliness. The method for network slicing provided by examples of the present disclosure includes: determining a service keyword of a service intention after receiving the service intention from a user; converting the service intention into a network request according to the service keyword of the service intention on the basis of a pre-established mapping model, wherein, the network request comprises at least one network requirement index; determining a set of network slicing configuration parameters according to the network request and current network environment state on the basis of a network slicing model, wherein the network slicing model is a deep neural network model for determining network slicing configuration parameters according to a network request and a network environment state; and performing a network slicing according to the set of network slicing configuration parameters.

One or more examples of the present disclosure also provide a device for network slicing, which may comprise a memory, a processor and a computer program stored on the memory and executable on the processor, wherein the processor, when executing the program, implements the method for network slicing.

One or more examples of the present disclosure also provide a non-transitory computer readable storage medium, wherein the non-transient computer readable storage medium stores computer instructions for causing the computer to perform the method for network slicing.

As can be seen, the method for network slicing, the device for network slicing and the computer readable storage medium in accordance with examples of the present disclosure can analyze an intention represented by the service intention and convert the intention into requirements on various network indexes automatically, and then can find a better network slicing strategy and perform the network slicing according to the various network indexes and the current network state. Through the above network slicing solution not only service requirements of the user can be met, but also a high flexibility and timeliness of network slicing can be achieved.

BRIEF DESCRIPTION OF DRAWINGS

In order to explain one or more examples of the present disclosure more clearly, accompanying drawings illustrating examples of the present disclosure are briefly introduced. Obviously, the accompanying drawings are only one or more examples of the present disclosure. Those of ordinary skill in the art may further obtain other accompanying drawings based on these accompanying drawings without paying any creative work.

DETAILED DESCRIPTION OF THE EXAMPLES

Figure 1:
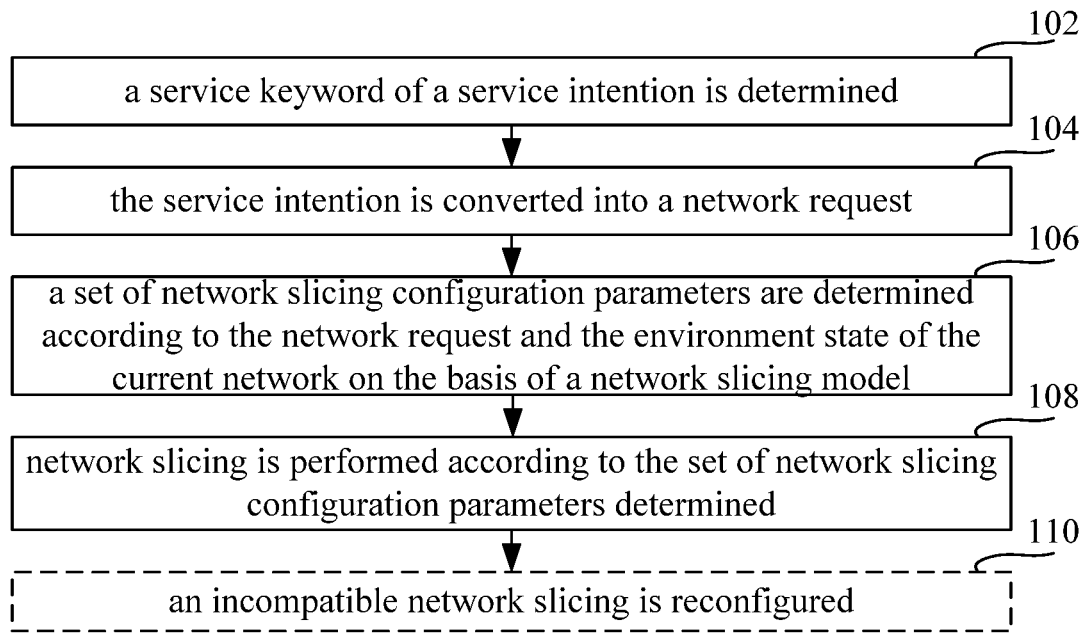
FIG. 1 is a flow chart of a method for network slicing according to some examples of the present disclosure.

In order to make the objectives, technical solutions, and advantages of the present disclosure clearer, the present disclosure will be further described in detail with reference to specific examples described below together with the accompanying drawings.

It should be noted that, unless otherwise defined, the technical terms or scientific terms used in one or more examples of the present disclosure should have the ordinary meanings understood by persons with ordinary skills in the field of the present disclosure. The terms "first", "second" and the like used in one or more examples of the present disclosure do not indicate any order, quantity or importance, but are only used for distinguishing different constituent components. The terms "comprising" or "containing" and the like mean that the element or object appearing in front of the term covers the elements or objects and their equivalents listed after the term, without excluding other elements or objects. The terms such as "connection" or "connected" and the like are not limited to physical or mechanical connections, but may comprise electrical connections, regardless of direct connection or indirect connection. The terms "up", "down", "left", "right" and the like are only used for indicating the relative position relationship. When the absolute position of the described object changes, the relative position relationship may also change accordingly.

Some examples of the present disclosure provide an intention-based network slicing method which can determine a network slicing strategy according to a service intention so as to perform a flexible and rapid network slicing.

In some examples of the present disclosure, the essence of the above-mentioned intention is to embody a mapping relationship between diversified characteristics carried by different services in a network and network strategies or actions, thus to characterize a motivation of the service to implement certain changes to the network. The strategy refers to configurations of the network automatically generated under a strong intention constraint and is a specific implementation solution for realizing an intention target. A user only needs to express a service demand when issuing the service request, in which an intention is indicated. Hereinafter, a service request indicating an intention may be called as a service intention for short. The network side can then obtain a strategy for network slicing by analyzing the service intention. In general, the mapping of the service intention to the strategy for network slicing is usually a one-to-many relationship, namely, the service intention can be achieved by combining a plurality of fine-grained strategies. That is, the user's service intention can be implemented by a combination of various strategies. This is an intelligent implementation process, also known as an intelligent strategy. The intelligent strategy is a series of configuration rules for the network, which are used to control and manage network resources, define the actions that the network can do under intention constraints, and to realize an optimal adaptation of the intention and the strategies.

Hereinafter, the intention-based network slicing method according to some examples of the present disclosure will be described in detail with reference to the accompanying drawings.

FIG. 1 is a flow chart of a network slicing method according to some examples of the present disclosure. The network slicing method disclosed may be performed by a network slicing server which is responsible for network slicing operations. As shown in FIG. 1, the method may include:

In block 102, a service keyword of a service intention is determined after receiving the service intention.

In some examples of the present disclosure, the above-mentioned service intention may be a service request expressed in a natural language, which indicates an intention of a user, i.e., expressing requirements on a service requested by the user. Therefore, in the above block 102, it is necessary to perform an intention analysis on the service intention received from the user and determine a service keyword of the service intention based on the analysis result, that is, determine the intention of the user.

Figure 2A:
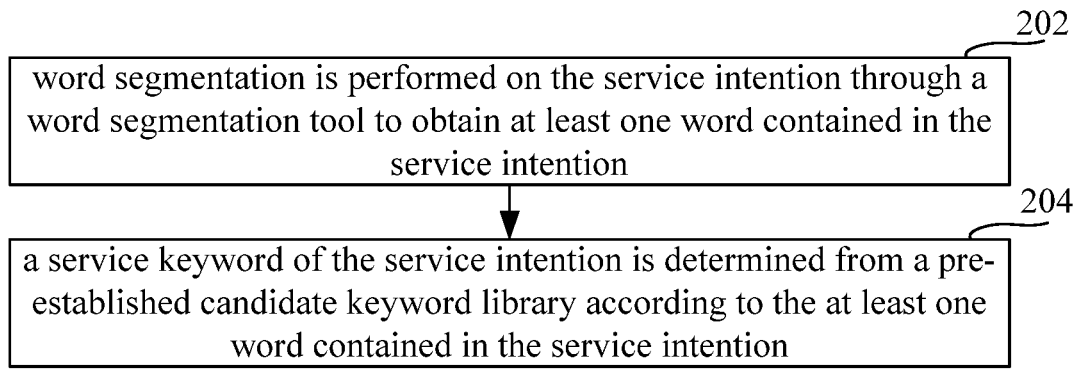
FIG. 2A is a flow chart of determining at least one service keyword corresponding to a service intention according to some examples of the present disclosure.

Specifically, the above block 102 may be implemented by the method shown in FIG. 2A. As shown in FIG. 2A, the method for determining a service keyword of a service intention may specifically include the following steps.

In block 202, word segmentation is performed on the service intention through a word segmentation tool to obtain at least one word contained in the service intention.

Specifically, according to some examples of the present disclosure, the word segmentation tool can be used for segmenting the service intention according to multidimensional information such as part-of-speech, indexes, and self-defined dictionaries.

In block 204, a service keyword of the service intention is determined from a pre-established candidate keyword library according to the at least one word contained in the service intention.

In some examples of the present disclosure, the service keyword of the service intention can be extracted from the pre-established candidate keyword library by utilizing a keyword extraction algorithm.

Specifically, the candidate keyword library can be established by the following steps: first, obtaining words relating to service intentions of Internet of Things (IoT) by learning language materials related to service intentions of IoT; and then adding the words into a word library to establish the candidate keyword library.

In some specific implementations, an optical network intention-related corpus may be extracted from the NLTK library to establish the candidate keyword library for optical network related services. In general, the NLTK library provides corpus resources relating to a plurality of technical fields. In view of the fact that the corpus resources provided by the NLTK library are all in English, in some examples of the present disclosure, the corpus relating to IoT services in the NLTK may be translated into a target language in advance, such as into Chinese, to obtain the corpus of the target language, so that the candidate keyword library may be established in the target language.

In some examples of the present disclosure, the keyword extraction algorithm adopted may be specifically Intent Analysis based on Latent Dirichlet Allocation (IA-LDA) method. According to this method, firstly, distributions of intention themes are calculated. Then, iterations are carried out according to vocabulary distributions and the intention themes. Later, distributions of candidate keywords are calculated. And then similarities between the intention themes and the candidate keywords are calculated and ordered. At last, first n words are selected from the candidate keywords as effective keywords extracted.

In addition, in other examples of the present disclosure, in the above block 204, the service keyword of the service intention may also be determined by calculating the correlation of each candidate keyword in the candidate keyword library to each word of the at least one word and selecting the candidate keyword with the highest correlation to the at least one word as the service keyword.

Figure 2B:
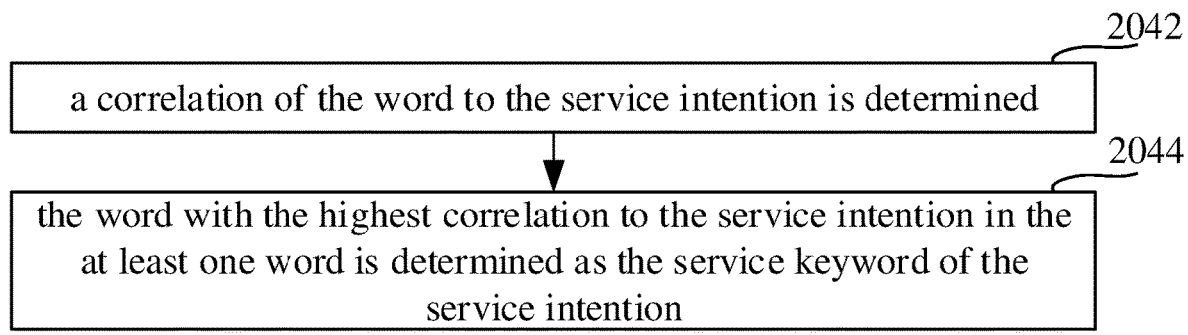
FIG. 2B is a flow chart of determining a service keyword of the service intention from a pre-established candidate keyword library according to the at least one word contained in the service intention according to some examples of the present disclosure.

Furthermore, as shown in FIG. 2B, in some other examples of the present disclosure, the above block 204 may include the following steps.

In block 2042, with respect to each of the at least one word obtained after word segmentation of the service intention, a correlation of the word to the service intention is determined.

Specifically, it is supposed that $I_k$ represents a $k^{th}$ service intention; $w_i$ represents an $i^{th}$ word in the at least one word obtained by word segmentation on the service intention i. At this time, $p(w_i|I_k)$ represents the correlation between $w_i$ and $I_k$.

In some examples of the present disclosure, $p(w_i|I_k)$ can be determined by the following expression.

$$p(w_i|I_k)=p(w_i|z_j)*p(z_j|I_k)$$

Where, $z_j$ represents a theme corresponding to $w_i$, which can also be considered as a candidate keyword corresponding to $w_i$.

By the above expression, a probability distribution of $w_i$ in the service intention text can be calculated.

In block 2044, the word with the highest correlation to the service intention in the at least one word is determined as the service keyword of the service intention.

That is, in the example above, for the $I_k$, $w_i$ with the highest $p(w_i|I_k)$ is selected as its keyword.

In block 104, the service intention is converted into a network request according to the service keyword of the service intention on the basis of a pre-established mapping model, wherein each network request includes at least one network requirement index.

In some examples of the present disclosure, since the service keyword extracted cannot be understood by a decision layer of network slicing, a standardized data model is required to describe the service intention of the user for intention analysis. That is, the service keyword extracted needs to be packaged into a standard data format. According to some examples of the present disclosure, the packaging process may be implemented on the basis of a pre-established mapping model. Wherein, the mapping model may contain mapping relationships between current diversified service keywords and various network requirement indexes. In some examples of the present disclosure, the network requirement index may specifically include one or more of bandwidth, delay, jitter, bit error rate, fault tolerance rate, session layer packet loss rate and etc.

In particular, in some examples of the present disclosure, the service intention analysis can be performed by an Intent North-Bound Interface (Intent NBI) to obtain the mapping model.

Moreover, in some examples of the present disclosure, the mapping model may be implemented by a mapping table. Table 1 below shows a specific example of a mapping table of service keywords and network requirement indexes.

Figure 2C:
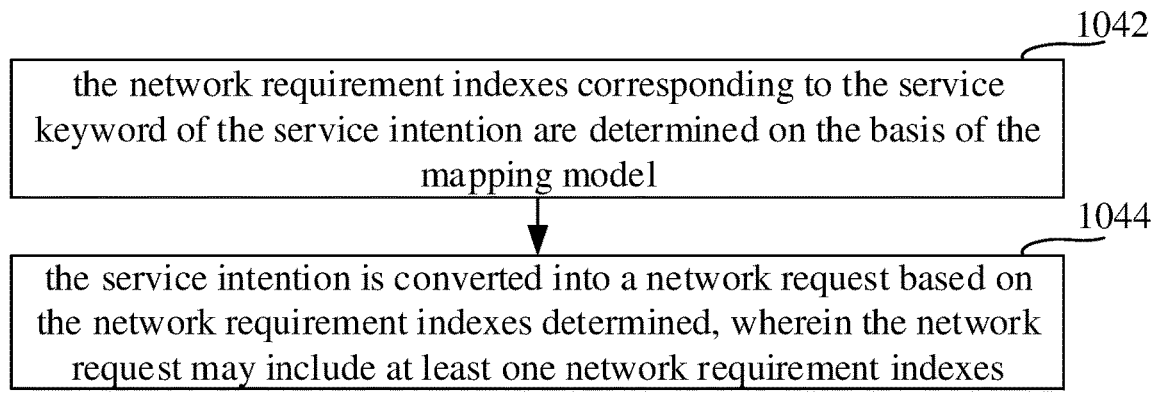
FIG. 2C is a flow chart of converting the service intention into a network request according to the service keyword of the service intention on the basis of a pre-established mapping model according to some examples of the present disclosure.

As such, as shown in FIG. 2C, in some examples of the present disclosure, with respect to each service intention, the above block 104 may specifically include the following steps:

In block 1042, the network requirement indexes corresponding to the service keyword of the service intention are determined on the basis of the mapping model.

In particular, in some examples of the present disclosure, the network requirement indexes corresponding to the service intention can be obtained by looking up the mapping table of service keywords and the network requirement indexes shown in Table 1 for the service keyword of the service intention. For example, based on Table 1, for a service keyword such as teleconference, it can be determined that, for this service intention, a requirement on a bandwidth is 460 kbps, a requirement on an end-to-end delay is 15 ms/node, a requirement on a transmission delay is 1 ms, a requirement on a jitter is 30 ms, a requirement on a bit error rate is 3%, and a requirement on a session layer packet loss rate is 1%, and etc. As in another example, for a service keyword of a voice message, it can be determined that, for this service intention, a requirement on a bandwidth is 60-80 kbps, a requirement on an end-to-end delay is 1 s, a requirement on a transmission delay is 2 s, a requirement on a jitter is 100 ms, a requirement on a bit error rate is 3%, a requirement on a session layer packet loss rate is less than <2%, and etc.

In block 1044, the service intention is converted into a network request based on the network requirement indexes determined, wherein the network request may include at least one network requirement indexes.

In some example of the present disclosure, the network request may include an identification (ID) field and an operation field. The identification field is used for carrying an ID capable of uniquely identifying the network request so as to avoid conflicts of different network requests among different entities. The operation field may include address information of a source node of the service intention.

TABLE 1

| Service keyword | Network requirement index | | | | | | |
|---|---|---|---|---|---|---|---|
| | Bandwidth (kbps) | End-to-end time delay | Transmission time delay | Jitter | Bit error rate | Fault tolerance rate | Session layer packet loss rate |
| Voice applications | 19 | 150 ms | 1 ms | 50 ms | 3% | ✓ | |
| VOIP | 17-106 | 15 ms | 1 ms | 50 ms | 3% | ✓ | 1% |
| Video conferencing | 460 | 15 ms | 1 ms | 30 ms | 3% | ✓ | 1% |
| E-mail | 10 | 2 s | | | 0 | x | 5% |
| Message | | −10 s | | | 0 | x | 1% |
| Voice message | 60-80 | 1 s | 2 s | 100 ms | 3% | ✓ | <1% |
| Multimedia | 28.5-500 | | 2 s | 150 ms | 0% | ✓ | <2% |
| ... | ... | ... | ... | ... | ... | ... | ... |

As can be seen from Table 1, each service keyword corresponds to a series of specific network requirement indexes, so that the service keywords of the service intention can be mapped to specific requirements on the series of network requirement indexes by querying Table 1.

Moreover, the operation field may also include the requirements on the at least one network index.

In other examples of the present disclosure, the network request may be in a general message format to facilitate transfer of information between different protocol layer entities. For example, in addition to the identification field and the operation field, the network request may further include a type field and an object field. The type field is used for setting the type of the message. In some examples of the present disclosure, the type of the network request can be generally set as Request. The object field is used to represent an object of the message. In some examples of the present disclosure, the object of the network request may be generally set as Connection. In this example, in the above block 1044, the at least one network requirement index may be packaged into a network request based on a pre-configured format.

For example, for a service intention, if an address of a source node corresponding to the service intention is "10.108.69.3", a requirement on a bandwidth corresponding to the service intention is 200 M, and a requirement on a delay is 10 ms, the network request corresponding to the service intention can be expressed in the format of the following message:

```
{
    "packetType" : "request" ,
    "intentID" : "450db050-4013-bceb-e53213ed7a6d" ,
    "object" : "connection" ,
    "operation" :
    {   "src" : "10.108.69.3" ,
        "constraint" :{ "bandwidth" : "200M" ,
        "latency" :   "10ms" },
    }
}
```

In block 106, a set of network slicing configuration parameters are determined according to the network request and the environment state of the current network on the basis of a network slicing model, wherein the network slicing model is a deep neural network model for determining network slicing configuration parameters according to one or more network requests and the network environment state.

In block 108, network slicing is performed according to the set of network slicing configuration parameters determined.

Specifically, in some examples of the present disclosure, in the above block 106, the network slicing model searches for a network slicing strategy with a maximum reward value from a pre-established network slicing strategy library as the determined network slicing strategy according to the at least one network request and the environment state of the current network. Here, a network slicing strategy corresponds to a set of network slicing configuration parameters, which also corresponds to an action taken by the network. That is, searching for a network slicing strategy with a maximum reward value means searching for a set of network slicing configuration parameters with a maximum reward value. Moreover, the pre-established network slicing strategy library is used to store a plurality of sets of network slicing configuration parameters.

In some examples of the disclosure, the network slicing strategy library mainly includes two types of fine-grained strategies, namely a routing strategy and a service ordering strategy. A fine-grained strategy also corresponds to a set of network slicing configuration parameters.

Specifically, the routing strategy may include sets of network slicing configuration parameters determined based on a first hit algorithm, a source-destination node fixed routing algorithm (such as Dijkstra algorithm), source-destination node fixed routing algorithm with candidate paths (such as K short path algorithm) and an adaptive routing algorithm. Thus, in some examples of the present disclosure, an appropriate routing strategy may be selected based on the at least one network request and the current network bandwidth occupancy.

In addition, the service ordering strategy may include sets of network slicing configuration parameters determined based on ordering by service priority, by bandwidth required, by service path and hops, and so on. The reason for designing the service ordering rules is that when multiple service requests are issued at the same time, conflicts among the multiple service requests may occur due to the limitation of network resources. By setting the service ordering strategy, the service intention can be ordered so as to avoid conflicts among the multiple service intentions.

As can be seen, the method for network slicing according to examples of the present disclosure can automatically analyze an intention represented by a service intention, convert the intention into various network requirement indexes, find a better network slicing strategy according to the various network requirement indexes and the current network state and then perform network slicing. On one hand, the network slicing solution can meet service requirements of the user. On the other hand, the network slicing solution has high flexibility and timeliness.

Figure 3:
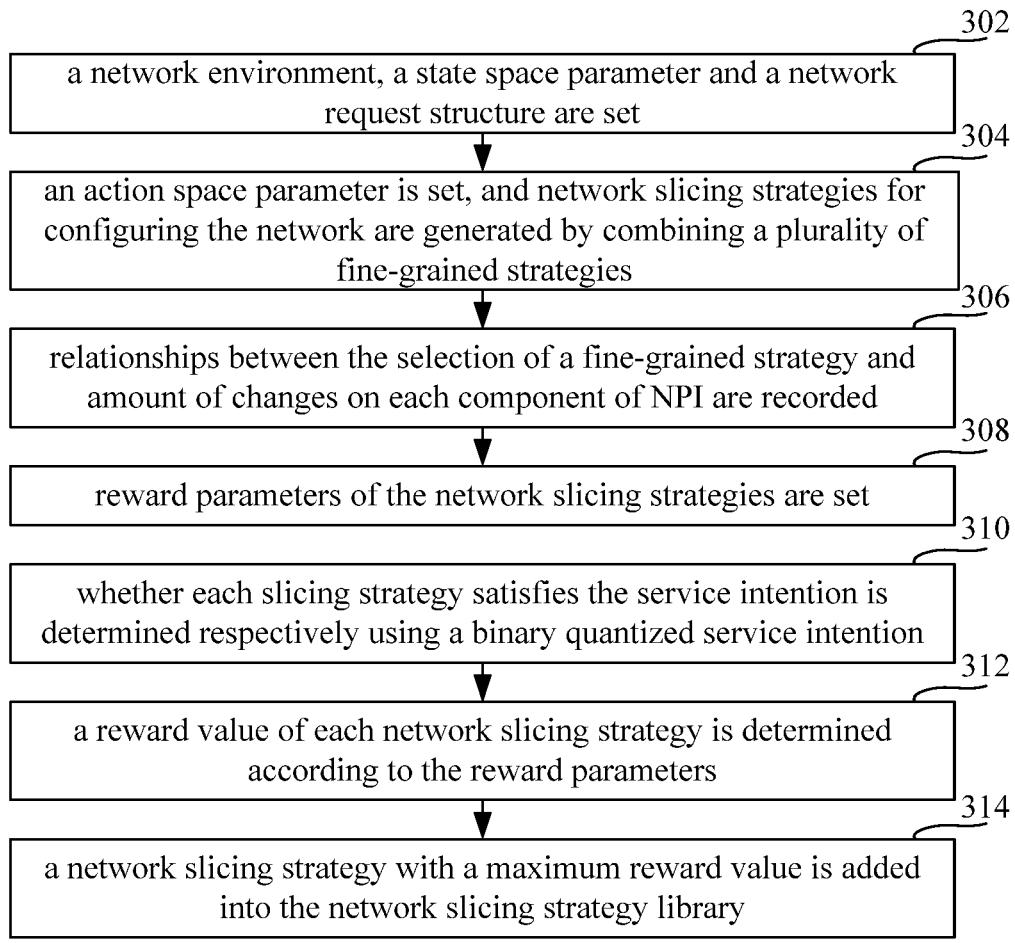
FIG. 3 is a flow chart of creating a network slicing strategy library according to some examples of the present disclosure.

Specifically, in some examples of the present disclosure, the network slicing strategy library may be created by the method shown in FIG. 3.

In block 302, a network environment, a state space parameter and a network request structure are set, wherein the network request structure may include multidimensional information such as objects, operations and results.

In some examples of the present disclosure, the above-mentioned network environment refers to perception of state of the whole network before making any decisions. The state space refers to a complete description on external environment by self-perception before making any decisions. The network request structure specifically refers to the mapping of a decision to be made in a given state space, which may include objects, operations, results, and so on.

Step 304, an action space parameter is set, and network slicing strategies for configuring the network are generated by combining a plurality of fine-grained strategies. Wherein, the fine-grained strategies may include one or more routing rules, one or more service ordering rules and so on.

In some examples of the present disclosure, each network slicing strategy corresponds to a network slicing action, that is network configuration based on a set of network slicing configuration parameters. Moreover, the network slicing action is a loosely coupled and extensible set of slice strategies.

In block 306, relationships between the selection of a fine-grained strategy and amount of changes on each component of network performance index (NPI) are recorded.

In some examples of the present disclosure, a fine-grained strategy may directly relate to some NPI. That is, the selection of a fine-grained strategy may affect each component of the NPIs directly. The components of the NPIs may include at least one of load, blocking rate, load balancing, time delay, and etc.

In block 308, reward parameters of the network slicing strategies are set.

For example, it is assumed that three fine-grained strategies involved in an operation are formalized as A=($\Delta$SS, $\Delta$CRS, $\Delta$SRS), where $\Delta$SS, $\Delta$CRS, $\Delta$SRS corresponds to the change magnitude of a component of the net present value.

Wherein, A represents the reward parameters of the network slicing strategy obtained by combining the three fine-grained strategies.

According to some examples of the present disclosure, the reward parameters of the network slicing strategies may specifically refer to a reward function, which may be a feedback function calculated after executing a network slicing strategy. In some examples of the present disclosure, the purpose of integrating optimal network slicing strategies is to find a combination strategy with a highest network slicing reward.

That is, in the above blocks 304-308, the routing strategies and the service ordering strategies may be combined in different ways to obtain a plurality of network slicing strategies, and the reward parameter for each network slicing strategy can be set for evaluating each network slicing strategy.

In block 310, whether each slicing strategy satisfies the service intention Ir is determined respectively using a binary quantized service intention $V_{Ir}$.

Specifically, in some examples of the present disclosure, the binary quantized service intention can be specifically expressed by the following expression:

$$V_{Ir_i} = \begin{cases} 1, & Ir_i \text{ is satisfied} \\ 0, & \text{is not satisfied} \end{cases}$$

Where, $Ir_i$ represents a component of a vector Ir; $V_{Ir_i}$ represents the binary quantized service intention which indicates whether the component of the vector Ir is satisfied.

In block 312, a reward value of each network slicing strategy is determined according to the reward parameters.

In some examples of the present disclosure, the reward function can be set by the following expression to determine the reward value corresponding to the network slicing strategy.

$$r_s = r_{s,Ir} + r_{s,NPI}$$

Where, $r_s$ represents a reward in a state s; $r_{s,Ir}$ represents a reward part in the reward function, and the reward part is related to the service intention Ir; $r_{s,NPI}$ represents a penalty part of the reward function, and the penalty part is related to the NPI. The state s refers to a state of selecting a certain network slicing strategy; and when in the state s, it indicates that the network takes an action corresponding to the network slicing strategy.

In some examples of the present disclosure, the reward part $r_{s,Ir}$ in the reward function can be determined by the following expression:

$$r_{s,Ir} = \sum_{i=1}^{n} dim(s)V_{Ir_i} = \begin{cases} \sum_{i=1}^{n} dim(s)V_{Ir_i}, & Ir_i \text{ is satisfied} \\ 0, & \text{none of } Ir \text{ is satisfied} \end{cases}$$

Where, dim(s) is the dimension of the state s vector. When a certain component of the service intention Ir is satisfied, $r_{s,Ir}$ will give a positive feedback and $r_{s,Ir}$ is less than or equal to the dimension of the vector s. When none of service intention Ir is satisfied, $r_{s,Ir}$ returns to 0.

In some examples of the present disclosure, the penalty part $r_{s,NPI}$ in the reward function can be determined by the following expression:

$$r_{s,NPI} = \sum_{j=1}^{n} \text{normalize}(NPI_j)$$

Where, $\sum_{j=1}^{n}$ normalize ($NPI_j$) represents normalized components of the NPI vector. This is because NPIs differ greatly in the values on each dimension. Therefore, a normalization function is used to normalize the values on each dimension to [0, 1] in this example, to avoid the domination of some metrics.

Furthermore, in other examples of the present disclosure, different weighting factors $\omega_j$ may be provided for each dimension of the NPI. In this case, the penalty part $r_{s,NPI}$ in the reward function can be determined by the following expression:

$$r_{s,NPI} = \sum_{j=1}^{n} \omega_j \times \text{normalize}(NPI_j)$$

As can be seen from the reward function, when the network slicing strategy corresponding to a combination of a set of fine-grained strategies meets the service intention, a larger reward can be obtained. And when the network slicing strategy does not meet the service intention, no reward or little reward can be obtained. Meanwhile, the higher the utilization of network resources is, the greater the reward is, while the lower the utilization of resources is, the less the reward is. Therefore, it needs to continually adjust the network slicing strategy to maximize the reward by finding a balance between the satisfaction of service intention and NPI.

In block 314, a network slicing strategy with a maximum reward value is added into the network slicing strategy library.

After the network slicing strategy library is established, a network slicing strategy can be determined according to the network request and the environment state of current network on the basis of the network slicing strategy library and the deep neural network model. Specifically, in the above block 106, all possible network slicing strategies can be analyzed by the deep neural network model, and reward values of each network slicing strategy can be obtained; and the network slicing strategy with the largest reward value is then selected for the network slicing.

In some examples of the present disclosure, the deep neural network model may be a Deep Deterministic Policy Gradient (DDPG) model. The DDPG model is one of deep reinforcement learning. The DDPG model includes an action network (Actor) and an evaluation network (Critic), wherein the Actor takes a state s as an input, fits a strategy π and outputs an action a=π(s), i.e., directly selects the action a based on the current state s. The Critic takes the state s and the action a as inputs and a cumulative reward Q(s, a) as an output for evaluating the effect of taking the action a in the state s. The Actor is used to take an action, and the Critic is used to estimate the rewards of action to evaluate the quality of the action. Through the cooperation of the Actor and the Critic, the decision-making effect can be to continuously improved and independent decision-making can be achieved.

Figure 4:
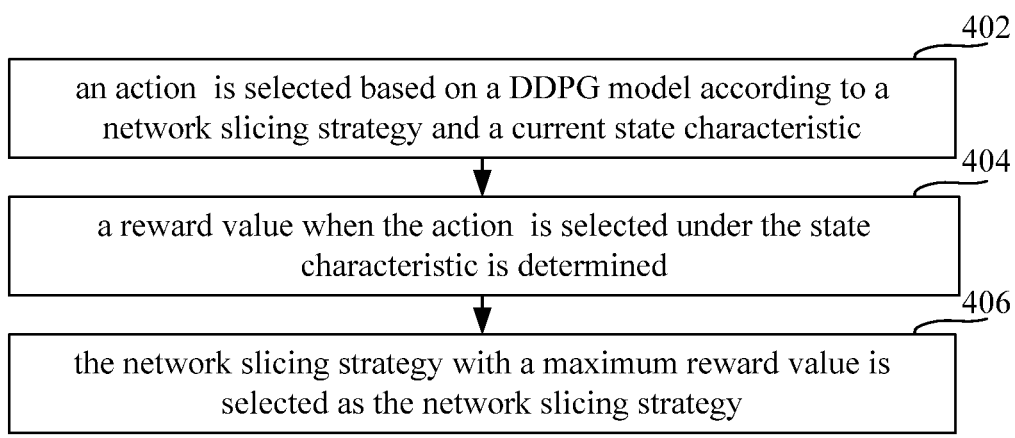
FIG. 4 is a flow chart of determining network slicing measurements according to some examples of the present disclosure.

In the following, the method for determining the network slicing strategy is described in detail by taking the DDPG model as an example. Specifically, the operations shown in FIG. 4 may be performed separately for each network slicing strategy μ in the network slicing strategy library in the above block 106.

In block 402, an action $a_t$ is selected based on a DDPG model according to a network slicing strategy μ and a current state characteristic $s_t$.

In particular, in some examples of the present disclosure, the selection process of the action $a_t$ can be expressed by the following expression:

$$a_t = \mu(s_t | \theta^\mu)$$

Wherein, $\theta^\mu$ is a parameter of the strategy network generating a deterministic action and related to the network slicing strategy μ.

In some examples of the present disclosure, the state characteristic $s_t$ is a complete disclosure of an external environment obtained by perception and may include the network requirement indexes contained in the network request and a set of current NPIs of the network.

In these examples, the network requirement indexes refer to the network requirement indexes contained in the network request corresponding to the service intention and can be represented by the network requirement index set $(Ir_1, Ir_2, \ldots$ and $Ir_n)$, wherein $Ir_i$ corresponds to an $i^{th}$ network request (service intention) for indicating the network requirement indexes contained in the network request.

Furthermore, the set of current NPIs of the network may include blocking probabilities, jitter, time delay, and active flows of slices, etc., and the set of NPIs is input into the DDPG model as environmental state characteristics. The set of NPIs may be represented as NPI={$NPI_1$, $NPI_2$, ..., $NPI_t$}, where $NPI_i$ corresponds to an $i^{th}$ network performance index. Specifically, an NPI tetrad (Blocking Rate-Load Balancing-Bandwidth-Time Delay) may be set and its initial values may be set to (10, 10, 10, 10), (90, 90, 90, 90), (50, 50, 50, 50), (90, 10, 90, 10), respectively.

In other examples of the present disclosure, since the span of the NPI interval of each dimension differs greatly from the value, it is not convenient to display the result directly. Therefore, it is necessary to normalize the NPI vector so as to display the result conveniently. Specifically, it can be determined by the following expression:

$$X = X_l + (X_r - X_l) \times \frac{|NPI_i - NPI_{il}|}{|NPI_{ir} - NPI_{il}|}$$

Where, X represents a normalized NPI vector; $NPI_i$ represents a true value of certain dimension information of NPI; $NPI_{il}$ and $NPI_{ir}$ respectively represent boundary values of dimension intervals; and $X_l$ and $X_r$ represent boundary values of quantization value intervals, respectively.

After calculation, the corresponding relationship between the NPI main performance metric interval and the quantization value interval can be obtained, as shown in the following Table 2.

The NPIs of the network after performing the network slicing is composed of multi-dimensional indexes such as bandwidth, time delay, blocking rate, link load balancing and the like. Since the span of the index interval of each dimension differs greatly from the value, it is necessary to normalize the vector NPI in order to show the results.

Moreover, in other examples of the present disclosure, the quantized NPI vector may be further normalized. This can be accomplished by the following expression:

$$Ir = 0.177B + 0.152D + 0.123LB + 0.548BR$$

Where, B, D, LB, and BR represent the bandwidth, the time delay, the load balancing, and the blocking rate, respectively. The normalization coefficients of the B, D, LB and BR are set according to actual application scenes, and different normalization coefficient values can be set for different applications.

In addition, in order to verify the accuracy of the algorithm provided by examples of the present disclosure, a threshold $Ir_0$ corresponding to the normalized NPI vector Ir can be further determined. According to some examples of the present disclosure, the service intention of "constructing continuous and stable connection between two services" is selected, and the Ir obtained by calculating the bandwidth of 30 Mbps, the time delay of 50 ms, the load balance of 0.05 and the blocking rate of 5% is used as a threshold $Ir_0$. That is, by substituting the above data into the two expressions, the threshold $Ir_0$ can be calculated to be 72.

In addition, in some examples of the present disclosure, the DDPG model can set an objective function according to the following expression:

$$J(\theta^\mu) = E_{\theta\mu}[r_1 + \gamma r_2 + \gamma^2 r_3 + \ldots]$$

Where, $E_{\theta\mu}[\ ]$ represents an expected value; $r_1$ represents a first data point of time series participating in training, and so on; and γ represents a weight. Here, $\gamma \in [0,1]$ represents a larger proportion of rewards closer to the current time.

In some examples of the present disclosure, the DDPG model may select an action according to a set deterministic strategy parameter μ, as shown in the following expression:

$$a_t = \mu(s_t | \theta^\mu)$$

Where, $\theta^\mu$ is a parameter of the strategy network generating the deterministic action.

In block 404, a reward value when the action $a_t$ is selected under the state characteristic is determined, and the reward value is taken as a reward value corresponding to the current slicing strategy μ.

Specifically, the reward value may be determined by a reward expectation based on the selection of the action $a_t$ by the network slicing strategy μ and the current state characteristic $s_t$, with reference to the following expression:

$$J_\beta(\mu) = \int \rho^\beta(s_t) Q^\mu(s_t, a_t) ds_t$$

Where, $Q^\mu(s_t, a_t)$ represents a reward expectation value corresponding to the action $a_t$, which can be determined by the following expression:

$$Q^\mu(s_t, a_t) = E[r(s_t, a_t) + \gamma Q^\mu(s_{t+1}, a_{t+1})]$$

TABLE 2

| Quantization value | <60 | 60-70 | 70-80 | 80-90 | 90-100 |
|---|---|---|---|---|---|
| Bandwidth | <10 Mbps | 10-20 Mbps | 20-50 Mbps | 50-100 Mbps | >100 Mbps |
| Time delay | >200 ms | 100-200 ms | 50-100 ms | 10-50 ms | <10 ms |
| Load balancing | <0.04 | 0.04-0.06 | 0.06-0.08 | 0.08-0.1 | >0.1 |
| Blocking rate | 15%-20% | 10%-15% | 5%-10% | 1%-5% | <1% |

Where, E[ ] represents an expectation value; and $r(s_t, a_t)$ represents a reward value when the action $a_t$ is selected under the state characteristic $s_t$.

In some examples of the present disclosure, the specific structure of the DDPG model may be as shown in Table 3 below:

TABLE 3

| | |
|---|---|
| Primary hidden layer | 400, 300, 200 |
| Target hidden layer | 400, 300, 200 |
| DNEN hidden layer | 50, 50, 50, 10, 10, 1 |
| θ | 0.15 |
| σ | 0.2 |
| ξ | 0.4 |
| Time difference | 10-6 |
| Optimizer | Adam |
| Action learning rate | 10-4 |
| Critical learning rate | 10-3 |
| Weight attenuation coefficient | 10-6 |
| Replay experience | 5000 |
| Loss function | Square loss |

Here, the structure of the action network may be as shown in Table 4 below. On the basis of five fully connected layers (dense_1, dence_2, dence_3, dence_4, dence_5), a normalization layer (batch_normalization) is introduced to accelerate convergence, and a regularization layer (dropout_1) is introduced to avoid over-fitting. In addition, a plurality of activation layers, including a relu function and a tanh function, are added to the action network to improve the nonlinear characterization capability of the neural network. The structure of the evaluation network is generally similar to that of the action network, but does not include an activation layer, and the output layer dimension is 1, as shown in Table 5 below.

TABLE 4

| Layer (Type) | Shape of output | Parameters |
|---|---|---|
| dense_1 (full connection) | (None, 80) | 3150 |
| batch_normalization_1 | (None, 80) | 1200 |
| dropout_1 (dropout) | (None, 80) | 0 |
| dense_2 (full connection) | (None, 50) | 1510 |
| activation_2 (activation) | (None, 50) | 0 |
| dense_3 (full connection) | (None, 10) | 120 |
| activation_3 (activation) | (None, 10) | 0 |
| dense_4 (full connection) | (None, 5) | 50 |
| activation_4 (activation) | (None, 5) | 0 |
| dense_5 (full connection) | (None, 1) | 11 |
| activation_5 (activation) | (None, 1) | 0 |

All parameters: 5316
Trainable parameters: 3281
Untrainable parameters: 180

TABLE 5

| Layer (Type) | Shape of output | Parameters |
|---|---|---|
| dense_1 (full connection) | (None, 50) | 3150 |
| batch_normalization_1 | (None, 50) | 1200 |
| dropout_1 (dropout) | (None, 50) | 0 |
| dense_2 (full connection) | (None, 10) | 1510 |
| dense_3 (full connection) | (None, 1) | 120 |
| dense_4 (full connection) | (None, 5) | 50 |
| dense_5 (full connection) | (None, 1) | 11 |

All parameters 3662
Trainable parameter: 2100
Untrainable parameters: 120

Further, in a specific code implementation process, it is possible to set an action evaluation parameter of the DDPG network as $\theta^\mu$, an action parameter of the target network as $\theta^{\mu'}$, a comment evaluation parameter of the DDPG network as $\theta^Q$, and a comment parameter of the target network as $\theta^{Q'}$. The intention requests $I_r$ and $G(N, L, F, C, S)$ are set, resulting in an initial observation state $S_t$. The slicing strategy $a_t$ is derived from $S_t$ using an equation $a_t=\mu(s_t|\theta^\mu)$ and a parameter $\theta^\mu$. Then, the state $S'$ is observed at the next step, and the reward parameter $r_t$ is set. At this time, if the experience number is less than N, the storage experience $\{S_t, a_t, r_t, S'\}$ covers an initial capacity D. If the number of experiences is greater than N, the first saved experience is replaced with the storage experience $\{S_t, a_t, r_t, S'\}$ in the playback memory. Next, a batch of samples are randomly extracted from D to update action parameters $\theta^Q \leftarrow \theta^Q + \Delta\theta^Q$ and $\theta^{Q'} \leftarrow \delta\theta^Q + (1-\delta)\theta^{Q'}$, and to update penalty parameters $\theta^Q \leftarrow \theta^Q + \Delta\theta^Q$ and $\theta^{Q'} \leftarrow \delta\theta^Q + (1-\delta)\theta^{Q'}$. Then, a return parameter is calculated by the following equation $r_s = \Sigma_{i=1}^n \dim(s) V_{Ir_i} + \Sigma_{j=1}^n$ normalize ($NPI_j$). After the adjustment of the strategy selection action, the final generated strategy can be maintained near an upstream of the threshold $Ir_0$, meeting the algorithm design requirement of satisfying the intention request under the condition of being as high network resource utilization rate as possible.

In block 406, after determining the reward value corresponding to each network slicing strategy in the network slicing strategy library, the network slicing strategy with a maximum reward value is selected as the network slicing strategy.

By the network slicing method based on the DDPG model, the network slicing strategy with the highest reward value can be selected from various network slicing strategies, so that the network slicing configuration for the current service intention can be obtained, and the service intention of the user can be better met. In addition, since the selection of the network slicing strategy is automatically completed by the DDPG model, it has the characteristics of high flexibility and high speed.

In examples of the present disclosure, the quality of service (QoS) across the DDPG network may change due to the dynamics of the network environment, and there may be a phenomenon that the intention of the service is violated. In some examples of the present disclosure, a network slicing that violate the service intention are referred to as an incompatible network slicing. In this case, the network slicing method shown in FIG. 1 will further include a block 110, in which an incompatible network slicing is reconfigured.

Figure 5:
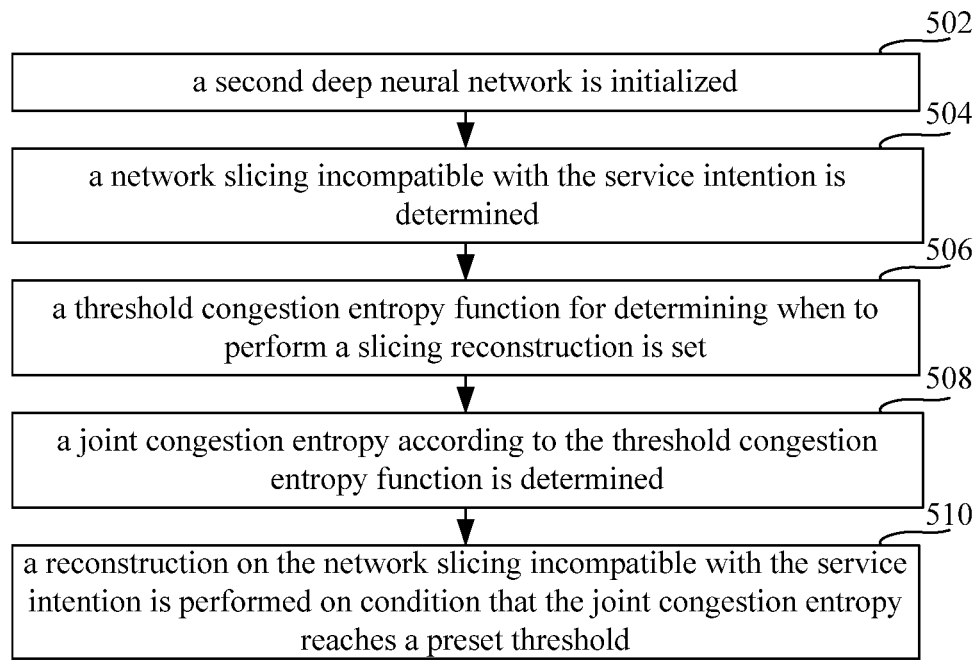
FIG. 5 is a flow chart of a network slicing reconfiguration according to some examples of the present disclosure.

In some examples of the present disclosure, the process for reconfiguring the incompatible network slicing may specifically refer to FIG. 5, and may include:

In block 502, a second deep neural network is initialized.

According to some examples of the present disclosure, the second deep neural network may be a Deep Neural Evolutionary Network (DNEN). Therefore, in the above block 502, the structure of a DNEN is initialized, and an input-output relationship of the DNEN is determined.

Specifically, in this block, the input-output relationship of the DNEN network can be defined as follows.

$$\begin{cases} h^{(l)} = \varphi^{(l)}\left(\sum_{i=1}^{n_l-1} h_i^{(l-1)} w_i^{(l)} + b^{(l)}\right) \\ l = 1, 2, \ldots, L \\ h^{(0)} = x \\ h^{(L)} = y \end{cases}$$

Where, $h^{(l)}$ represents an output of a layer $l^{th}$ of the DNEN network; $[\varphi^{(1)}, \varphi^{(2)}, \varphi^{(3)}, \ldots, \varphi^{(n)}]$ is an activation function; $w_i^{(l)}$ represents a weight parameter of an $i^{th}$ node of the $l^{th}$ layer; $b^{(l)}$ represents a threshold parameter of the $l^{th}$ layer; L represents the number of layers of the DNEN network; l represents an $l^{th}$ layer of the DNEN network; the input is x; the output is y; and $[n_0, n_1, n_2, \ldots, n_L]$ represents the dimensions of each neural layer.

Thus, it is possible to obtain:

$$y = h^{(L)} = \varphi^{(L)}\left(\sum_{i=1}^{n_L-1} h_i^{(L-1)} w_i^{(L)} + b^{(L)}\right) =$$

$$\varphi^{(L)}\left(\sum_{i=1}^{N_L-1} \varphi^{(L-1)}\left(\sum_{i=1}^{n_{L-1}-1} h_i^{(L-2)} w_i^{(L-1)} + b^{(L-1)}\right) w_i^{(L)} + b^{(L)}\right) =$$

$$\ldots = \varphi^{(L)}(\varphi^{(L-1)}(\ldots \varphi^{(l)}(x, \theta_l)\ldots, \theta_{L-1}), \theta_L)$$

Where, $\theta_l$ represents an activation layer parameter of the $l^{th}$ layer.

Moreover, in the above block 502, the DNEN network genome is encoded after obtaining the input-output relationship.

Further, an initial network ensemble is generated, a genome with higher constitution is selected when a calculated optimal adaptability is less than a preset accuracy threshold, and offspring is continuously generated by crossover and mutation until the calculated optimal adaptability is not less than the accuracy threshold.

In block 504, a network slicing incompatible with the service intention is determined.

According to examples of the present disclosure, in the above block 502, a resource slicing Fsus incompatible with the service intention is first discovered and determined as incompatible slicing, where Fsus={Fsus(i)|i=1,2, . . . }.

Then, the position and an observed state of the incompatible slicing is obtained.

Specifically, an initial network ensemble M is first generated. Then a genome with a higher constitution is selected when a calculated optimal adaptability is less than a preset accuracy threshold. Later, offspring are continuously generated by crossover and mutation until the calculated optimal adaptability is not less than the accuracy threshold, thereby the position of the incompatible slicing and the observed state can be determined.

In block 506, a threshold congestion entropy function for determining when to perform a slicing reconstruction is set.

In some examples of the present disclosure, the threshold congestion entropy function may be expressed as follows:

$$\begin{cases} \phi_i = \dfrac{\sum_{m=1}^{M} B_{m,i}}{\sum_{i=1}^{Slice} \sum_{m=1}^{M} B_{m,i}} \\ U(\phi) = -\sum_{i=1}^{Slice}\left(1 - \dfrac{\rho_i}{\rho_{max}(i)'}\right)\phi_i \log(\phi_i) \\ U(\phi, H) = -\alpha_\phi \sum_{i=1}^{Slice}\left(1 - \dfrac{\rho_i}{\rho_{max}(i)'}\right)\phi_i \log(\phi_i) - (1-\alpha_\phi)H \end{cases}$$

Where, $\phi_i$ represents a load balancing, and $B_{m,i}$ represents a bandwidth occupied by a $m^{th}$ service on the slicing $Slic_i$; M represents the number of intention services on the $Slic_i$; Slice represents the total number of fragments in the network; $\rho_{max}(i)$ represents a maximum possible bandwidth requirement; $\rho_i$ represents an average bandwidth requirement of $Slic_i$; $U(\emptyset)$ represents a simple entropy; $U(\emptyset, H)$ represents a joint congestion entropy; and $\alpha_\emptyset$ represents an adjustment factor for adjusting the trade-off between congestion level and slicing reconfiguration time.

In block 508, a joint congestion entropy according to the threshold congestion entropy function is determined.

In block 510, a reconstruction on the network slicing incompatible with the service intention is performed on condition that the joint congestion entropy reaches a preset threshold.

According to examples of the present disclosure, in the above block 510, the position of the network slicing incompatible with the service intention is input back to the deep neural network, that is, the DDPG, and then a reconstruction operation on the network slicing is performed by the deep neural network corresponding to the position of the network slicing incompatible with the service intention.

Specifically, according to some example of the present application, the DDPG performs a slicing reconfiguration action A=(ΔSS, ΔCRS, ΔSRS), where ΔSS, ΔCRS, and ΔSRS corresponds to the amplitude of change of some resource slicing.

It can be appreciated that DNEN applies evolutionary ideas to the iteration of neural networks, providing a training way to change both neural network topology and parameters. In DNEN, the storage of each individual is no longer a complex neural network, but a genome, which is a simplified genetic representation. DNEN alters a genomic structure by mutations or recombination. The mutations enable progeny genomes to explore new structures, weights and hyper-parameters of neural networks, and the recombination essentially fuses two genomes and their characteristics. DNEN provides a unique identifier for each mutation. An innovation number is assigned to a new node or a new connection when the new node or the new connection is generated. Genotypes of two individuals are arranged by matching the corresponding innovation numbers, with only different elements exchanged. Therefore, a nondestructive recombination of genomes is finally realized.

In order to satisfy the randomness of DNEN initial neural network topology, an initial neural network topology population should be designed to establish a population pool. Since the DNEN network topology is continuously optimized in an evolution process, a complex initial structure does not need to be carefully designed. Consistent with the traditional neural network, the DNEN initial neural network consists of an input layer, a hidden layer and an output layer. In order to increase the nonlinear characterization ability of neural networks, various activation layers are properly attached to the neural networks. The hidden layer maps the input data to a feature space, and the output layer maps the feature space to a label space. The input is an incompatible slicing set Fsus, and the output is an incompatible slicing position F. An input vector $x=[x_1, x_2, \ldots x_n]$ and a corresponding actual incompatible position y constitute a training sample $\langle x, y \rangle$. Thus, when an incompatible slicing occurs, the location of the incompatible slicing is displayed.

Figure 6:
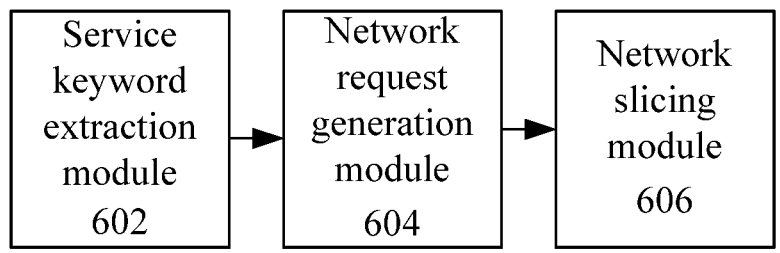
FIG. 6 is a schematic diagram illustrating an internal structure of a network slicing device according to some examples of the present disclosure.

Based on the above method for network slicing, some examples of the present disclosure further provide a device for network slicing, and the internal structure of the device is shown in FIG. 6. As shown in FIG. 6, the device may include: a service keyword extraction module 602, a network request generation module 604 and a network slicing module 606.

The service keyword extraction module 602 is configured to determine a service keyword of each service intention after receiving at least one service intention.

The network request generation module 604 is configured to convert each service intention into a network request according to the service keyword of each service intention on the basis of a pre-established mapping model of service keywords and network requirement index, wherein each network request may include at least one network requirement index.

The network slicing module 606 is configured to determine a network slicing strategy according to the at least one network request and the environment state of the current network on the basis of a network slicing model and perform the network slicing according to the network slicing strategy, wherein the network slicing model is a deep neural network model for determining network slicing configuration parameters according to the at least one network request and the network environment state.

Among them, specific implementations of the various modules may refer to the method for network slicing described above.

In addition, the device for network slicing may further include a slicing reconstruction module, which is configured to perform a network slicing reconstruction method shown in FIG. 5.

It should be noted that the methods of one or more examples of the present disclosure may be performed by a single device, such as a computer or server, etc. The method of one or more examples can also be applied to a distributed scenario, and multiple devices can be mutually matched to complete the method. In the case of such a distributed scenario, one of the multiple devices may perform only one or more of the steps of the method of one or more examples of the present disclosure, and the multiple equipment may interact with each other to perform the method.

The foregoing describes specific examples of the disclosure. Other examples are within the scope of the following claims. In some cases, the acts or steps recited in the claims may be performed in a different order than in the examples and still achieve the desired results. In addition, the processes depicted in the figures do not necessarily require the particular order or sequential order shown to achieve the expected results. In some examples, multitasking and parallel processing may also be possible or may be advantageous.

For convenience of disclosure, the device will be described by being divided into various modules in terms of functions. Of course, the functions of the various modules may be implemented in the same or more software and/or hardware in implementing one or more examples of the present disclosure.

The device disclosed by examples of the present disclosure is used to implement the above mentioned method for network slicing, and the device also has the beneficial effects of the method for network slicing, which will not be described in detail herein.

Figure 7:
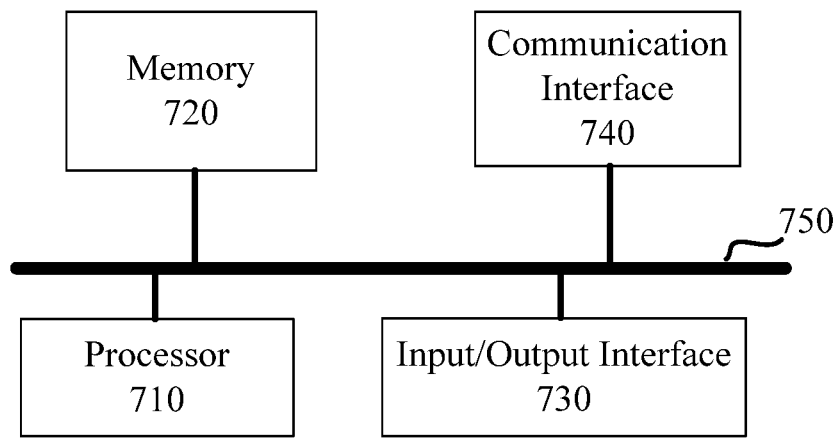
FIG. 7 is a schematic diagram illustrating an internal structure of a network slicing device according to some other examples of the present disclosure.

FIG. 7 is a more specific hardware architecture diagram of device for network slicing provided by some examples of the present disclosure. As shown in FIG. 7, the device for network slicing may include a processor 710, a memory 720, an input/output interface 730, a communication interface 740, and a bus 750. The processor 710, the memory 720, the input/output interface 730, and the communication interface 740 are communicatively coupled to each other within the equipment via the bus 750.

The processor 710 may be implemented using a general purpose CPU (Central Processing Unit), a microprocessor, an Application Specific Integrated Circuit (ASIC), or one or more integrated circuits for executing related programs to implement the network slicing method provided in the examples of the present disclosure.

The memory 720 may be implemented in the form of ROM (Read Only Memory), RAM (Random Access Memory), static storage devices, dynamic storage devices, etc. The memory 720 may store an operating system and other application programs. When the network slicing method provided by examples of the present disclosure is implemented in software or firmware, associated program code is stored in memory 720 and invoked for execution by the processor 710.

The input/output interface 730 is used for connecting the input/output modules to realize information input and output. The I/O modules may be configured as components in a device (not shown) or may be external to the device to provide corresponding functions. The input device can include a keyboard, a mouse, a touch screen, a microphone, various sensors and the like, and the output device can include a display, a loudspeaker, a vibrator, an indicator lamp and the like.

The communication interface 740 is used for connecting communication modules (not shown) to realize communication interaction between the present equipment and other equipment. The communication module can realize communication in a wired mode (such as USB, network wires and the like), and can also realize communication in a wireless mode (such as a mobile network, WIFI, Bluetooth and the like).

The bus 750 includes a path for transferring information between components of the equipment, such as processor 710, a memory 720, an input/output interface 730, and a communication interface 740.

It should be noted that although the device only shows the processor 710, the memory 720, the input/output interface 730, the communication interface 740, and the bus 750, the device may include other components necessary for proper operation in the particular implementation process. Moreover, those skilled in the art will appreciate that the equipment may also include only the components necessary to implement the examples of the present disclosure and not necessarily all of the components illustrated in the drawings.

The computer readable media of this example, including both permanent and non-permanent, removable and non-removable media, may implement information storage by any method or technique. The information may be computer readable instructions, data structures, modules of a program, or other data. Examples of storage media for a computer include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic cassettes, magnetic tapes and magnetic disk storage or other magnetic storage devices, or any other non-transmission medium, can be used to store information which can be accessed by a computing device.

One of ordinary skill in the art will understand that the discussion of any of the above examples is merely exemplary and is not intended to imply that the scope of the disclosure, including the claims, is limited to these examples. Combinations of features in the above examples or in different examples are also possible within the contemplation of the present disclosure, the steps may be performed in any order, and there are many other variations of different aspects of one or more examples of the present disclosure as described above, which are not provided in detail for the sake of brevity.

In addition, well-known power/ground connections to integrated circuit (IC) chips and other components may or may not be shown in the figures provided for simplicity of illustration and discussion and so as not to obscure one or more examples of the disclosure. Moreover, a device may be shown in block diagram form in order to avoid obscuring one or more examples of the present disclosure, and this may also take into account the fact that the details of implementations of the block diagram device are highly dependent on the platform on which one or more examples of the present disclosure are to be implemented (i.e., such details should be well within the understanding of one skilled in the art). Where specific details (e.g., circuits) are set forth in order to describe exemplary examples of the disclosure, it will be apparent to one skilled in the art that one or more examples of the disclosure may be practiced without these specific details or with variations of these specific details. Accordingly, this disclosure should be regarded as illustrative, and not as restrictive.

While the present disclosure has been described in conjunction with specific examples thereof, many alternatives, modifications, and variations thereof will be apparent to those of ordinary skill in the art in light of the foregoing disclosure. For example, other memory architectures (e.g., dynamic RAM (DRAM)) may use the examples discussed.

It is intended that the present disclosure cover all such alternatives, modifications and variations as fall within the broad scope of the appended claims. Accordingly, any omissions, modifications, equivalents, improvements, and the like which come within the spirit and scope of one or more examples of the present disclosure are intended to be included therein.

What is claimed is:

1. A method for network slicing, comprising:
   determining a service keyword of a service intention after receiving the service intention from a user;
   converting the service intention into a network request according to the service keyword of the service intention on the basis of a pre-established mapping model, wherein, the network request comprises at least one network requirement index;
   determining a set of network slicing configuration parameters according to the network request and current network environment state on the basis of a network slicing model, wherein the network slicing model is a deep neural network model for determining network slicing configuration parameters according to a network request and a network environment state; and
   performing a network slicing according to the set of network slicing configuration parameters;
   initializing a second deep neural network;
   determining a network slicing incompatible with the service intention;
   setting a threshold congestion entropy function for determining when to perform a slicing reconstruction;
   determining a joint congestion entropy according to the threshold congestion entropy function; and
   performing a reconstruction on the network slicing incompatible with the service intention on condition that the joint congestion entropy reaches a preset threshold; wherein,
   setting a threshold congestion entropy function for determining when to perform a slicing reconstruction comprises: setting the threshold congestion entropy function as follows:

$$\begin{cases} \emptyset_i = \dfrac{\sum_{m=1}^{M} B_{m,i}}{\sum_{i=1}^{Slice} \sum_{m=1}^{M} B_{m,i}} \\ U(\emptyset) = -\sum_{i=1}^{Slice}\left(1 - \dfrac{\rho_i}{\rho_{max}(i)'}\right)\emptyset_i \log(\emptyset_i) \\ U(\emptyset, H) = -\alpha_\emptyset \sum_{i=1}^{Slice}\left(1 - \dfrac{\rho_i}{\rho_{max}(i)'}\right)\emptyset_i \log(\emptyset_i) - (1 - \alpha_\emptyset) H \end{cases}$$

wherein, $\emptyset_i$ represents a load balancing, and $B_{m,i}$ represents a bandwidth occupied by a $m^{th}$ service on the slicing $Slici_i$; M represents the number of intention services on the $Slici_i$; Slice represents the total number of fragments in the network; $\rho_{max}(i)$ represents a maximum possible bandwidth requirement; $\rho_i$ represents an average bandwidth requirement of $Slici_i$; $U(\emptyset)$ represents a simple entropy; $U(\emptyset, H)$ represents a joint congestion entropy; and $\alpha_\emptyset$ represents an adjustment factor for adjusting the trade-off between congestion level and slicing reconfiguration time.

2. The method according to claim 1, wherein, determining a service keyword of a service intention comprises:
   performing a word segmentation on the service intention through a word segmentation tool to obtain at least one word contained in the service intention; and
   determining the service keyword of the service intention from a pre-established candidate keyword library according to the at least one word through a keyword extraction algorithm.

3. The method according to claim 1, wherein, converting the service intention into a network request comprises:
   determining at least one network requirement index corresponding to the service keyword of the service intention on the basis of the mapping model; and
   converting the service intention into the network request according to the at least one network requirement index corresponding to the service keyword of the service intention.

4. The method according to claim 3, wherein, the mapping model is a pre-established mapping table of service keywords and network requirement indexes; wherein,
   determining at least one network requirement index corresponding to the service keyword of the service intention on the basis of the mapping model comprises:
   determining the at least one network requirement index corresponding to the service keyword of the service intention according to the mapping table.

5. The method according to claim 3, wherein, converting the service intention into the network request according to the at least one network requirement index corresponding to the service keyword of the service intention comprises:

packaging the at least one network requirement index into a network request based on a pre-configured format.

6. The method according to claim 1, wherein, determining a set of network slicing configuration parameters according to the network request and current network environment state on the basis of a network slicing model comprises:

selecting, by the network slicing model, a set of network slicing configuration parameters corresponding to a network slicing strategy with a maximum reward value from a pre-established network slicing strategy library according to the network request and the current network environment state.

7. The method according to claim 6, wherein, the network slicing strategy library is established by:

setting a network environment, a state space parameter and a network request structure, wherein the network request structure comprises multidimensional information;

setting an action space parameter;

generating network slicing strategies for configuring network by combining a plurality of fine-grained strategies;

recording a relationship of selection of a fine-grained strategy and amount of changes on each component of network performance index (NPI);

setting reward parameters;

determining a reward value of each network slicing strategy according to the reward parameters; and adding a network slicing strategy with a maximum reward value into the network slicing strategy library.

8. The method according to claim 1, wherein, the deep neural network model is a Deep Deterministic Policy Gradient (DDPG) model.

9. The method according to claim 8, wherein, determining a set of network slicing configuration parameters according to the network request and current network environment state on the basis of a network slicing model comprises:

selecting an action according to each of network slicing strategies and a current state characteristic respectively on the basis of the DDPG model;

determining a reward value when the action is selected under the state characteristic as a reward value corresponding to the each of the network slicing strategies;

selecting a network slicing strategy corresponding to a maximum reward value from the network slicing strategies as a determined network slicing strategy; and determining a set of network slicing configuration parameters corresponding to the determined network slicing strategy as a determined set of network slicing configuration parameters.

10. The method according to claim 8, wherein, determining a reward value when the action is selected under the state characteristic as a reward value corresponding to the each of the network slicing strategies comprises:

determining the reward value based on a reward expectation on the selection of the action $a_t$ by the network slicing strategy $\mu$ and the current state characteristic $s_t$, with reference to the following expression:

$$J_\beta(\mu) = \int \rho^\beta(s_t) Q^\mu(s_t, a_t) ds_t$$

wherein, $Q^\mu(s_t, a_t)$ represents a reward expectation value corresponding to the action $a_t$.

11. The method according to claim 8, wherein, the DDPG model comprises an action network and an evaluation network; wherein the action network comprises five fully connected layers, a normalization layer, a regularization layer, and four activation layers; and the evaluation network comprises five fully connected layers, a normalization layer, and a regularization layer.

12. The method according to claim 1, wherein, the second deep neural network is a Deep Neural Evolutionary Network (DNEN).

13. The method according to claim 12, wherein, initializing a second deep neural network comprises:

initializing a structure of the DNEN;

determining an input-output relationship of the DNEN;

encoding the DNEN network genome;

generating an initial network ensemble;

selecting a genome with higher constitution when a calculated optimal adaptability is less than a preset accuracy threshold, and generating continuously offspring by crossover and mutation until the calculated optimal adaptability is not less than the accuracy threshold.

14. The method according to claim 1, wherein, determining a network slicing incompatible with the service intention comprises:

obtaining a position and an observed state of the network slicing incompatible with the service intention.

15. The method according to claim 1, wherein, performing a reconstruction on the network slicing incompatible with the service intention on condition that the joint congestion entropy reaches a preset threshold comprises:

determining a position of the network slicing incompatible with the service intention;

inputting the position back to the deep neural network to perform a reconstruction on the network slicing incompatible with the service intention by the deep neural network.

16. A device for network slicing, comprising a memory, a processor and a computer program stored on the memory and executable on the processor, wherein the processor, when executing the program, implements the method for network slicing according to claim 1.

* * * * *